United States Patent [19]
Bullock et al.

[11] Patent Number: 4,810,588

[45] Date of Patent: Mar. 7, 1989

[54] NONNESTING, STRAIGHT CORRUGATION METAL FOIL AND METHOD FOR MAKING SAME

[75] Inventors: Wesley P. Bullock, Windham; William A. Whittenberger, Garrettsville, both of Ohio

[73] Assignee: W. R. Grace & Co.-Conn., New York, N.Y.

[21] Appl. No.: 198,042

[22] Filed: May 24, 1988

[51] Int. Cl.$^4$ .............................................. B01J 35/04
[52] U.S. Cl. ..................................... 428/603; 502/439
[58] Field of Search ............... 428/606, 603, 604, 593; 52/795, 796, 797, 798, 799, 800, 801; 502/439

[56] References Cited

U.S. PATENT DOCUMENTS

| | | | |
|---|---|---|---|
| 390,941 | 10/1888 | Baillie | 428/603 |
| 3,037,592 | 6/1962 | Shipley et al. | 52/798 |
| 3,966,646 | 6/1976 | Noakes et al. | 502/439 |
| 4,576,800 | 3/1986 | Refallick | 502/439 |

FOREIGN PATENT DOCUMENTS

| | | | |
|---|---|---|---|
| 3515681 | 11/1986 | Fed. Rep. of Germany | 502/439 |
| 466727 | 1/1936 | United Kingdom | 52/799 |
| 2001547A | 2/1979 | United Kingdom | 502/439 |

Primary Examiner—John J. Zimmerman
Attorney, Agent, or Firm—Steven T. Trinker

[57] ABSTRACT

There is provided a substantially nonnesting corrugated catalytically active thin metal foil suitable for making a monolith which when encased in a housing and inserted in the exhaust line, e.g., an automobile exhaust line, will remove pollutants in the exhaust. The device is rendered substantially nonnesting by forming the corrugations according to guidelines and which corrugations are perpendicular to the longitudinal marginal edges of the metal foil. The pressure drop through the device is thus minimized and the necessity for a flat foil co-laminate is avoided.

14 Claims, 4 Drawing Sheets

WAVELENGTH

AMPLITUDE

PATTERN

REPEATING UNIT

WAVE TYPES

4 CHORDS

A CONTACTING PT.
IF B > f(A) WHERE
f = NESTING FRACTION

ZERO POINT

NONNESTING, STRAIGHT CORRUGATION METAL FOIL AND METHOD FOR MAKING SAME

This invention relates, as indicated, to a straight corrugated metal foil in which the corrugations are orthogonal or at a slight angle (3° to 10°) to a line normal to the marginal edges but have an irregularity in pitch pattern, or a variable pitch, such that nesting of one layer upon the next succeeding layer is substantially avoided. This avoids the necessity for a flat foil strip to be interposed between layers of corrugated foil for preventing nesting.

BACKGROUND OF THE INVENTION AND PRIOR ART

Monoliths manufactured using corrugated thin metal foils are being used in a number of applications, e.g., as selective catalytic reduction (SCR) units in power plant exhaust lines, or in catalytic converters for stationary or automobile engine exhaust lines. Of particular interest are those monoliths which are of a flow-through design. The term "flow-through" describes a structure which has fluid flow passages, e.g., exhaust gas flow passages, which begin at one end of the unit and which end at the opposite end of the unit in a continuous manner. The length of the passage ways is not usually longer than the length of the monolith. If the corrugations are oblique, albeit straight through, the passageway will be slightly longer than the length of the monolith.

These structures are most commonly applied in the catalytic removal of pollutants in automotive exhaust, diesel exhaust, coal exhaust, glass plant exhaust, ozone removal, etc. Each application requires a different catalytic approach, consideration of the operating conditions of the catalyst, and the flow resistance or pressure drop through the unit.

Metal based monoliths can be made by corrugating thin metal strips of foil and stacking it either upon itself (with nothing between successive layers) or by separating the layers with flat foil. (See FIG. 1). The latter technique is often used with foil corrugated with a uniform, nestable, wave pattern (where the term "nestable" implies that two contiguous layers of this foil, if oriented in the usual way will nest completely together leaving no space between the contacting surfaces. This sort of pattern is useless for building up a monolithic honeycomb structure unless the successive layers are held apart by means of spacers, or typically, flat foil as shown in FIG. 1.

Another type of monolith is one built up using a corrugation which runs at an acute angle, usually 3°-10°, relative to a line orthogonal to the length of the foil strip. The corrugation may either continue across the width of the foil, or may be discontinuous or interrupted in a herringbone fashion across the width of the foil. This type of corrugated foil will not nest if folded back upon itself (See FIG. 2).

There are many diffrent combinations of these two basic structures which will not nest on layering. Some of these are:

(1) Herringbone or angled patterns folded back upon themselves will not nest.

(2) Alternating flat foil and straight corrugated foil will yield a nonnesting structure.

(3) Alternating flat and any type of corrugated foil will yield a nonnesting structure.

(4) Stacking alternating straight and then herringbone corrugated foils will yield a nonnesting structure.

(5) Stacking straight corrugations of differing wavelengths and/or amplitudes will yield partially nesting structures.

Structures (1) and (2) above are the most common of the flow-through monoliths, and each has its own particular advantages. The herringbone foil folded back upon itself is an excellent mass transfer structure because of the turbulence induced by the periodic flow interruptions. This is significant in that smaller catalyst surface is required for a given application as compared to a straight through cell catalyst surface of equal channel size. It is also easier to manufacture the herringbone type of foil than it is to make the alternating flat foil with a straight cell foil, because it requires but one type of foil to produce a monolith.

The alternating flat on straight corrugated monoliths, have lower pressure drop than the herringbone monoliths because they have straight channels which do not periodically interrupt the flow. These straight channels do not clog as easily in sooty environments for the same reason, i.e., particles tend to slip through rather than contact the walls of the monolith. They are more difficult to produce than the herringbone monoliths especially if the shape of the monolith is noncircular. The typical manufacturing technique is winding the foil in a spiral.

From the previous discussion, a desirable structure is one which requires a single type of foil, and which monolith can be produced by simply folding the corrugated foil back and forth upon itself in an accordion fold manner to provide layers of any desired cross-section, including circular, oval, or rectangular, or sections of any of the foregoing. It is, therefore, a primary objective of this invention to provide a structure and a method of making the same, characterized by a straight celled monolith having corrugations which do not nest when the corrugated foil is folded back upon itself, or accordion folded.

For convenience, the following terms as used herein will have the meanings ascribed to them:

Straight Cells. Straight cells are those formed from corrugations which run at a constant angle (e.g. 80°-90°) to the longitudinal marginal edges of the foil.

Wavelength. Wavelength is the length of the repeating unit in a corrugation pattern.

Amplitude. The amplitude of a corrugation is the vertical height of such corrugation from its base to its peak.

Pattern. A pattern is the longitudinal length of corrugations of a given amplitude and wavelength.

Repeating Unit. A repeating unit is a string of patterns, or a single pattern, which repeats periodically in phase, amplitude and wavelength.

Wave Type. The wave type is the geometric configuration of the wave and may be sinusoidal, square, triangular, trapezoidal, semicircular, etc.

Chord. A chord is the longitudinal span of corrugated foil in a layer, whether or not accordion folded, or in individual layers extending from one side to the other of a given geometric shape of the monolith.

Contacting Point. A contacting point in a multiwavelength design is the point where contiguous layers have less than a predetermined nesting fraction.

Nesting Fraction. The maximum amount of nesting which can occur at a contacting point.

Zero Point. The zero point is on the line drawn through the corrugation pattern at a value equal to one half the amplitude.

BRIEF STATEMENT OF THE INVENTION

Briefly stated, the present invention is a substantially nonnesting straight corrugated thin metal foil having parallel longitudinally extending marginal edges and wherein the corrugations are parallel to each other and are arrayed in a plurality of sequential repeating units, each of said repeating units including a plurality of patterns. The length of a repeating unit is no greater than the length of the smallest chord to be made, and the length of each pattern is constant within each repeating unit. In preferred embodiments, the corrugations are orthogonal to the marginal edges of the foil. Each pattern is preferably composed of a plurality of waves each having a predetermined wavelength to provide a variable pitch.

BRIEF DESCRIPTION OF THE DRAWINGS

The invention may be better understood by having reference to the annexed drawings wherein.

DETAILED DESCRIPTION OF THE INVENTION

In practice, a straight celled corrugation which has a single wavelength for its repeating unit, will nest upon itself completely when folded back upon itself, as in accordion folding. It has now been found that if certain guidelines are followed, a nonnesting device can be produced.

These guidelines are as follows:

1. The amplitude of a repeating unit must be constant.
2. The length of a repeating unit must be no greater than the length of the smallest fold to be made, if folding is the method of processing. Ideally, a maximum number of repeating units will be contained within each chord to promote an even nesting profile from one end of the chord to the other.
3. To ensure that the distance between any two adjacent contact points is less than N inches, the length of a pattern should be less than N inches.
4. The length of each pattern must be constant within a repeating unit.
5. The ideal wave type is one which has broad peaks.
6. Each pattern should start and stop on the zero line.
7. The number of patterns in a repeating unit should be maximized.

All of the foregoing guidelines are in a complex relationship with one another and need to be optimized for each core design being manufactured. If the corrugated foil is folded back upon itself, a certain number of contacting points will exist. There is an infinite number of positions along a repeating unit for this fold to take place, and therefore, there is an infinite number of possible contacting situations.

If one models the wavelengths, wave numbers, wave type, and repeating unit mathematically, and defines an acceptable nesting fraction (which in this case has been determined to be 0.85) one may step through a sufficiently large number of contacting possibilities, counting the number of contacting points at each position. FIGS. 4, 5, 6 and 7 were generated in this way.

It is interesting to note that the foil can be folded in two ways, and that the contacting possibilities will be different for each type of fold if the foil is asymmetrical about the zero line or zero "point". The two possibilities have been distinguished by referring to the contact points of one type of fold as positive contact points, and the other as negative contact points. Thus, one fold is formed in a clockwise direction (dotted line) and the other in a counter clockwise direction (solid line). In an accordion folded structure, clockwise and counter clockwise folds alternate.

Figure 1:
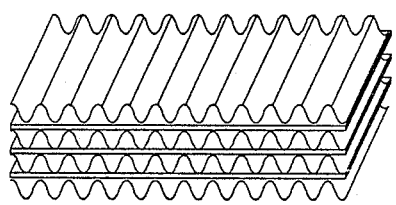
FIG. 1 shows a portion of a built up structure having alternating flat metallic strips and corrugated metal strips.
Figure 2:
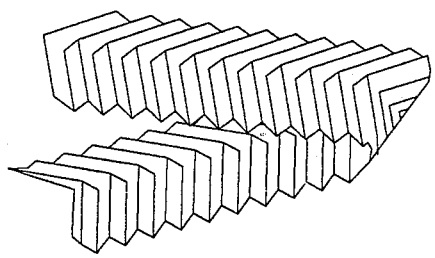
FIG. 2 shows a nonnesting herringbone foil folded on itself and illustrating how the pattern reverses when the foil is reverse folded upon itself.
Figure 3:
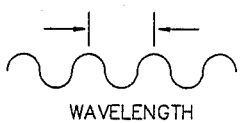
FIG. 3 shows illustrations of the terms defined above.
Figure 3:
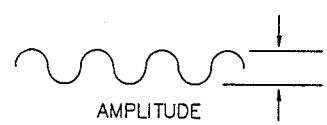
Figure 3:
Figure 3:
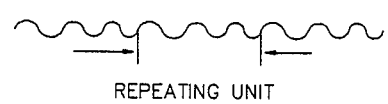
Figure 3:
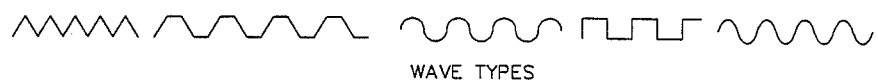
Figure 3:
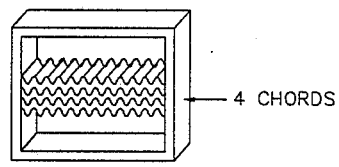
Figure 3:
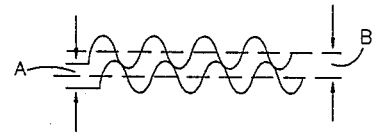
Figure 3:
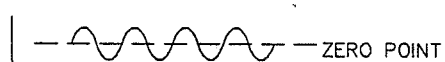
Figure 4:
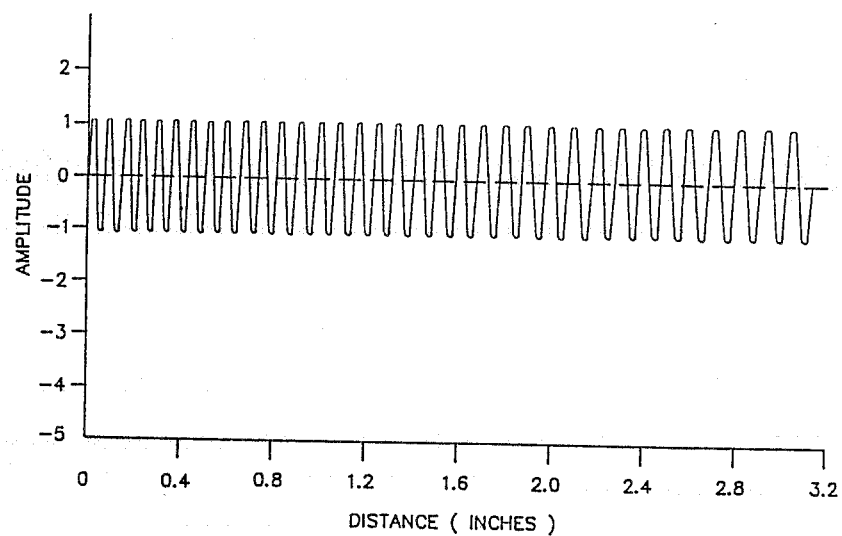
FIG. 4 is a graph showing the gear geometry and plots amplitude vs. distance in inches.
Figure 5:
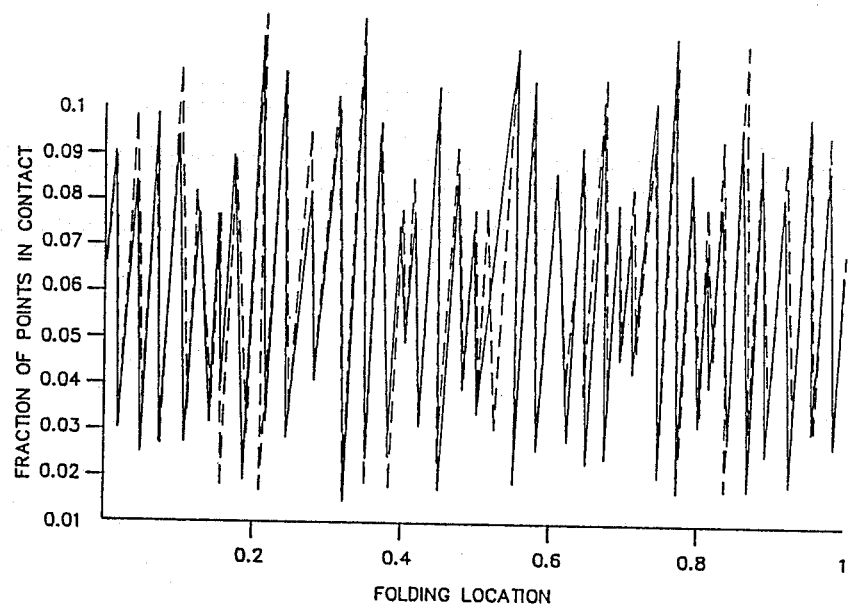
FIG. 5 is a graph showing the fraction of points in contact vs. the possible points where the foil can be folded, expressed as $1/L_o$ where 1 is the distance in inches from the beginning of the pattern, and $L_o$ is the length in inches of the repeating unit for the gear geometry of FIG. 4.
Figure 6:
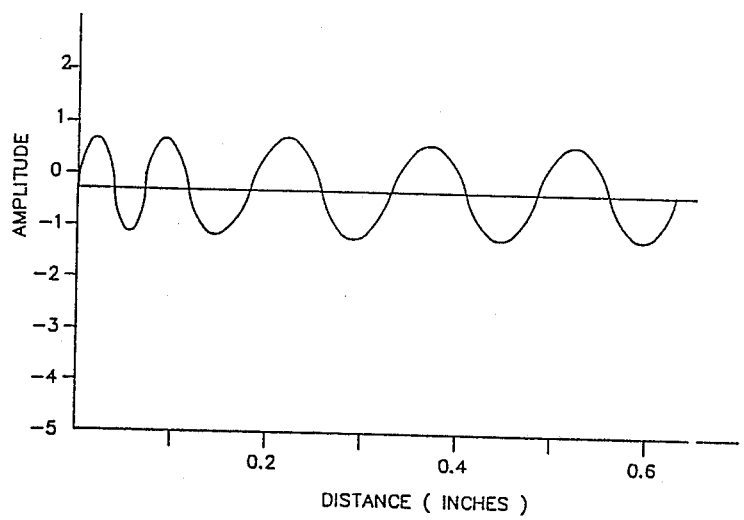
FIG. 6 is another gear geometry graph plotting amplitude vs. distance in inches.
Figure 7:
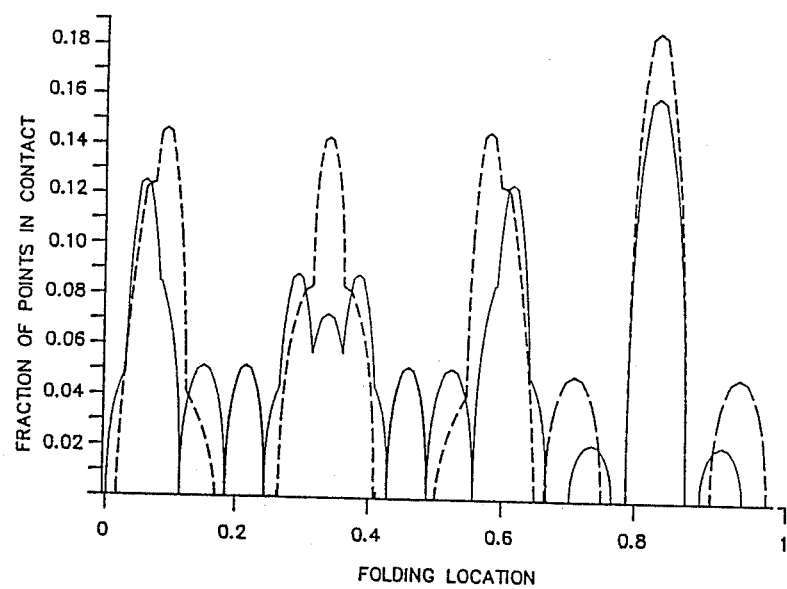
FIG. 7 is a graph showing the fraction of points in contact vs. folding location expressed as $1/L_o$ as in FIG. 5 for the gear geometry of FIG. 6.

In FIGS. 5 and 7, $N_c$ is the number of points in contact divided by the number of points sampled, 1 is the position along the repeating pattern measured in inches, and $L_o$ is the repeating unit length.

Essentially, the preferred design maximizes $N_c$ and minimizes the standard deviation of the number of points in contact. The following tables I and II correspond to FIGS. 4 and 6, respectively, and stimulate fold positions both positive and negative, indicate the number of steps in the iteration (number of average positive and negative contact points measured after stepping through the iteration, the nesting fraction used in the model, the standard deviation of the number of points in contact (dividing by the number of steps in the iteration yield the standard deviation of the fraction of points in contact), and the average fraction of positive and negative points in contact over the range of contacting possibilities.

TABLE I

| | |
|---|---|
| Number of steps in the iteration (FIG. 4) | 1000.00 |
| Average positive contact points over repeating pattern | 49.184 |
| Average negative contact points over repeating pattern | 50.581 |
| Fraction nesting | 0.85 |
| Standard deviation of positive contact points | 16.083 |
| Standard deviation of negative contact points | 16.331 |
| Fraction of positive points in contact/total points | 0.049 |
| Fraction of negative points in contact/total points | 0.051 |

TABLE II

| | |
|---|---|
| Number of steps in the iteration (FIG. 6) | 1000.00 |
| Average positive contact points over repeating pattern | 43.523 |
| Average negative contact points over repeating pattern | 56.156 |
| Fraction nesting | 0.85 |
| Standard deviation of positive contact points | 43.019 |
| Standard deviation of negative contact points | 51.682 |
| Fraction of positive points in contact/total points | 0.044 |
| Fraction of negative points in contact/total points | 0.056 |

FIG. 5 represents the contacting of a ten-pattern repeating unit of nearly constant pattern length. FIG. 7 is a two pattern repreating unit of nonconstant pattern length. In both cases the nesting fraction was taken as 0.85. The nesting factor or fraction may be in the range of 0.80 to 1.0. Note the higher standard deviation of contact points in FIG. 7 and the greater regularity of less-than-0.85 contacting (FIG. 7 has more points on the zero line). Both of these observations indicate that the corrugation pattern of FIG. 5 is the preferred as between the two, FIGS. 5 and 7.

Figure 8:
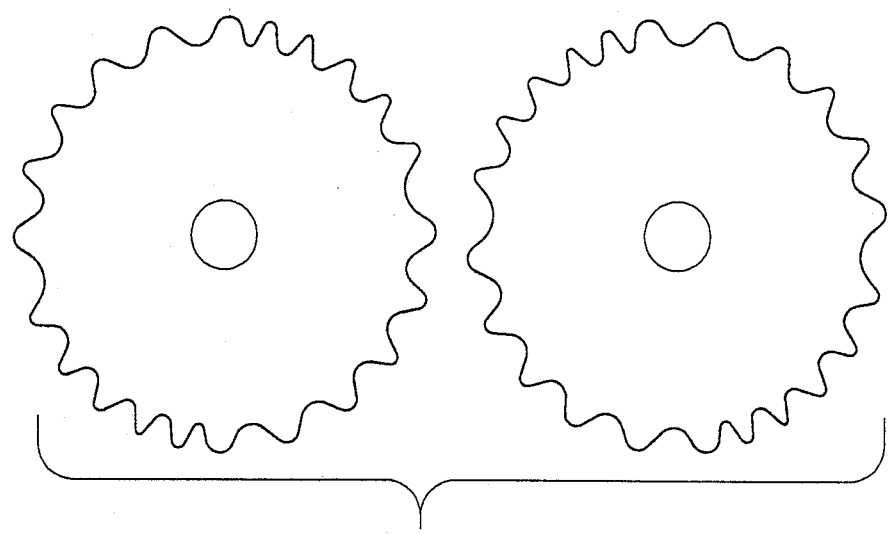
FIG. 8 is a gear set for corrugating thin metal foil with a pattern in accordance with the present invention.

The type of gear which is capable of forming these complicated waves is straight toothed and as wide as is necessary to corrugate a given width of foil. The tooth construction for a six-pattern gear made to the specifications in Table III below is illustrated for the manufacture of sinusoidal waves in FIG. 8. It should be noted that the mating gears are not identical to each other and must contain an integer number of repeating units. It is assumed that a cell geometry is optimal if the amplitude of the cell is about ½ of the weighted average wavelength. The pitch diameter in a typical case is 2.5 inches.

TABLE III

| Wave Number | Wavelength (Inches) | Number of Waves | Pattern Length (Inches) |
|---|---|---|---|
| 1 | .07 | 2.5 | 0.175 |
| 2 | .09 | 2.5 | 0.225 |
| 3 | .15 | 1.5 | 0.225 |
| 4 | .11 | 2.5 | 0.275 |
| 5 | .13 | 1.5 | 0.195 |
| 6 | .17 | 0.5 | 0.085 |

Total repeating unit length = 1.180 inches.
Average wavelength (weighted) = 1.18/11 = .107
Optimum wave amplitude = .107/2 = 0.054 inch.

This type of partially nesting or substantially nonnesting corrugated foil is useful to make metal, e.g., stainless steel, monoliths. The surface of the corrugated metal is conveniently coated with a high surface area wash coat, typically alumina or alumina/rare earth combination, in the manner described in U.S. Pat. No. 4,711,009 dated Dec. 8, 1987, the disclosure which patent is incorporated herein by reference thereto. The surface so generated can then be activated by treatment with a catalytically active solution as described in said patent, e.g., platinum, palladium, platinum/rhodium, etc. The monoliths are then suitably housed and are operative to remove pollutants from automotive exhaust, coal exhaust, glass plant exhaust, incinerator exhaust, etc.

What is claimed is:

1. A substantially nonnesting straight corrugated thin metal foil having parallel longitudinally extending marginal edges and wherein the corrugations are parallel to each other and are arrayed in a plurality of sequential repeating units, each of said repeating units including a plurality of patterns; the length of a repeating unit being no greater than the length of the smallest chord to be made, and the length of each pattern being constant within a repeating unit.

2. A nonnesting straight corrugated foil in accordance with claim 1 wherein the corrugations are orthogonal to the marginal edges of the foil.

3. A nonnesting straight corrugated foil in accordance with claim 1 wherein each pattern is composed of a plurality of waves each having a predetermined wave length.

4. A nonnesting straight corrugated foil in accordance with claim 3 wherein the product of the wave length and the number of waves in said pattern is the pattern length.

5. A nonnesting straight corrugated foil in accordance with claim 1 wherein the length of a repeating unit is the summation of the number of pattern lengths contained therein.

6. A nonnesting straight corrugated foil in accordance with claim 3 wherein each wave has a sinusoidal configuration.

7. A nonnesting straight corrugated foil in accordance with claim 3 wherein eacn wave has a square configuration.

8. A nonnesting straight corrugated foil in accordance with claim 3 wherein each wave has a trapezoidal configuration.

9. A nonnesting straight corrugated foil in accordance with claim 1 wherein the number of contacting points between layered chords is maximized.

10. A nonnesting straight corrugated foil in accordance with claim 8 wherein the standard deviation in the number of contacting points is minimized.

11. A nonnesting straight corrugated foil in accordance with claim 1 wherein the corrugations have a constant amplitude.

12. A substantially nonnesting straight corrugated thin metal foil in accordance with claim 1 additionally characterized by a nesting factor of 0.80 to 1.0.

13. A folded substantially nonnesting straight corrugated thin metal foil in accordance with claim 1 additionally characterized by a nesting factor of from 0.80 to 1.0.

14. A substantially nonnesting straight corrugated thin metal foil in accordance with claim 1 wherein the metal is stainless steel.

* * * * *